United States Patent [19]

Jones et al.

[11] 3,889,904

[45] June 17, 1975

[54] MEANS AND METHOD FOR SERVICING FLUID CUSHIONED AIRCRAFT LANDING GEAR STRUTS

[76] Inventors: Chester L. M. Jones, 2610 W. Jefferson St.; Raymond J. Yoakam, 4618 N. 71st Ave.; Mitchell M. Hazar, 3120 N. Rose Circle Dr., all of Phoenix, Ariz. 85026; Alfred J. Dillon, 4800 W. Ocotillo, Glendale, Ariz. 85301

[22] Filed: June 20, 1973

[21] Appl. No.: 371,860

[52] U.S. Cl............... 244/104 R; 141/49; 141/239; 188/352
[51] Int. Cl............................................. B64c 25/60
[58] Field of Search......... 244/104 R; 188/352, 322; 134/123, 166 R, 166 C, 34; 137/15, 154; 141/231, 49; 184/1.5

[56] References Cited
UNITED STATES PATENTS

| | | | |
|---|---|---|---|
| 2,295,539 | 9/1942 | Beach | 188/352 |
| 2,479,139 | 8/1949 | Seigel | 184/1.5 |
| 2,644,548 | 7/1953 | Schiemann | 188/352 |
| 2,665,772 | 1/1954 | Greer et al. | 184/1.5 |
| 2,955,625 | 10/1960 | Patterson | 141/231 X |
| 3,154,087 | 10/1964 | Beaver | 188/352 X |

Primary Examiner—Trygve M. Blix
Assistant Examiner—Paul E. Sauberer

[57] ABSTRACT

A method for servicing fluid cushioned aircraft landing gear struts wherein a portable vehicle is provided for use at airports or aircraft landing areas, for use in replacing used fluids in aircraft landing gear struts. The method comprising the release of fluids from collapsible aircraft landing gear struts by opening a fitting communicating with the interior thereof and allowing the weight of the aircraft to move the aircraft downward uniformly in a direction to cause collapse of the respective struts and to thereby force fluids to be purged therefrom as the weight of the aircraft moves the aircraft downward uniformly and causes the respective struts to collapse. The method also comprising introducing new fluids through the fitting for the purpose of pressurizing the interior of the respective strut and causing it to expand and lift the weight of the aircraft uniformly to a normal operating position whereby the entire servicing method of the invention allows the aircraft to rest upon a wheel supporting surface during the purging of old fluid from the struts and the charging of new fluid thereinto.

7 Claims, 7 Drawing Figures

PATENTED JUN 17 1975

3,889,904

SHEET 1

MEANS AND METHOD FOR SERVICING FLUID CUSHIONED AIRCRAFT LANDING GEAR STRUTS

BACKGROUND OF THE INVENTION

In most instances the means and methods of the prior art used for servicing collapsible and fluid cushioned aircraft landing gear struts have involved the employment of jacks for the purpose of jacking the wings of the aircraft and then jacking the wheel axles upward away from the wheel supporting surface such as a runway, and thereby collapsing each respective landing gear strut while a fluid fitting is in open position in order to collapse the strut and to force used fluid therefrom. Additionally, prior art methods have allowed the used fluids to pass from the open fitting on the strut and to spray or drain onto adjacent areas of the aircraft and onto the runway or hanger floor or other wheel supporting surface. Accordingly prior art methods have been time consuming as well as untidy and in many instances wasteful of various fluids, some of which may be reclaimed or used for other purposes after being exhausted from the collapsible struts of the aircraft landing gear.

Furthermore, the conventional method of jacking the aircraft wings and wheels upwardly has created some hazardous conditions for those persons servicing such struts and furthermore the support of the jacks used for such purposes has posed a problem in some areas where wheel supporting surfaces are relatively soft.

Additionally, time consumed in operating the jacks as well as the hazards thereof have heretofore been quite costly in terms of labor and material.

SUMMARY OF THE INVENTION

The present invention comprises a means and method involving the use of the weight of an aircraft for moving the aircraft downward and collapsing the landing gear struts for the extraction of used fluid and the use of new or replacement fluid under pressure for the purpose of recharging the collapsible struts and thereby extending them and raising the weight of the aircraft, all of which obviates the use of jacks and the hazards involved in jacking the wheels and lower position of the aircraft landing gear upwardly while maintaining the aircraft fuselage and wings on wing jacks. The means of the invention comprises a portable vehicle having a frame which carries means for collecting used fluid from aircraft landing gear struts and also provides means for adding new fluid under pressure; the portable means containing complete controls for the exhaustion of fluid from struts as well as the introduction of new fluid thereinto so as to control the pressure, the rate of fluid removal and replacement as well as the salvage of fluids when the fluids purged from the strut are sufficiently clean to allow proper filtering thereof.

The invention also comprises a novel means and method which avoids the waste of hydraulic fluids which are normally exhausted under pressure onto the aircraft and surrounding areas and must be mopped up. The invention also is very efficient in servicing landing gear struts under various climatic conditions.

The invention is also adapted to service landing gear struts when the aircraft is in hangers or on various surfaces, including a great variety of runways due to the fact that the weight of the aircraft is always born on the wheels thereof and only moves upward and downward relative thereto without the use of jacks which often times are precarious when the support therefor is not proper.

The invention is also capable of efficiently and quickly servicing aircraft landing gear struts while passengers or cargo are aboard the aircraft and furthermore the invention provides for the servicing of such struts in very short periods of time which saves money and also provides a great deal of passenger convenience and furthermore helps the aircraft operators maintain vital schedules.

The invention is capable of servicing a plurality of collapsible landing gear struts all at one time so that the entire area of the aircraft may be allowed to move downward uniformly in response to its weight for exhausting used fluids from the struts and whereby pressurized fluid added to the struts may uniformly move the aircraft upward to a proper operating level.

The invention is capable of reducing the servicing time from hours to minutes in some instances as compared to prior practices.

The invention further provides for the removal of used fluids and adding new fluids in a controlled manner to remove foreign matter from the struts and to insure longevity and safe functioning thereof.

The invention also reduces the hazard of injury to personnel servicing struts and also prevents the messy dispersion of oil in the area of servicing as has been attended to prior art servicing methods.

The invention also provides for the retention of the conventional charging fittings on the collapsible strut mechanism of the aircraft landing gear in order to insure control and safety as well as efficient servicing of the respective strut.

The invention also provides for efficient and accurate purging and recharging of fluids relative to collapsible struts so as to attain proper suspension to avoid either overcharging or undercharging the struts with pneumatic fluid whereby such pneumatic fluid such as nitrogen, is precisely added to the correct operating levels under controlled methods which include rate controls as well as pressure controls.

Accordingly, it is an object of the invention to provide a very efficient means and method as well as a safe means and method for servicing pneumatically cushioned collapsible aircraft landing gear struts.

Another object of the invention is to save time and money in the servicing of aircraft landing gear struts as well as to provide a portable means which may be readily used in various areas and on various wheel supporting surfaces due to the method of the invention which allows the weight of the aircraft to move downward for collapsing the struts and thereby purging used fluid therefrom and due to the introduction of new fluids at properly controlled pressures and rates for again extending the struts and consequently raising the weight of the aircraft upward to a proper and efficient operating level.

Another object of the invention is to provide a novel, useful and very efficient means for servicing aircraft landing gear struts which is very simple and easy to operate, efficient, durable and very reliable.

Another object of the invention is to provide a novel method which may be used efficiently, economically, and safely for the purpose of servicing aircraft landing gear struts in a great variety of environmental conditions as well as support conditions on hanger floors, runways, or any other surface capable of supporting the aircraft wheels.

Another object of the invention is to provide a very rapid means and method for servicing aircraft landing gear struts which permits the servicing to be accomplished while passengers and cargo are aboard.

Another object of the invention is to provide a means and method for servicing aircraft landing gear struts which utilizes a minimum of manpower and saves time and materials as well as to provide better scheduling of aircraft due to reduced down time for said servicing operations.

Further objects and advantages of the invention may be apparent from the following specification, appended claims and accompanying drawings.

DESCRIPTION OF THE PREFERRED EMBODIMENTS

Figure 1:
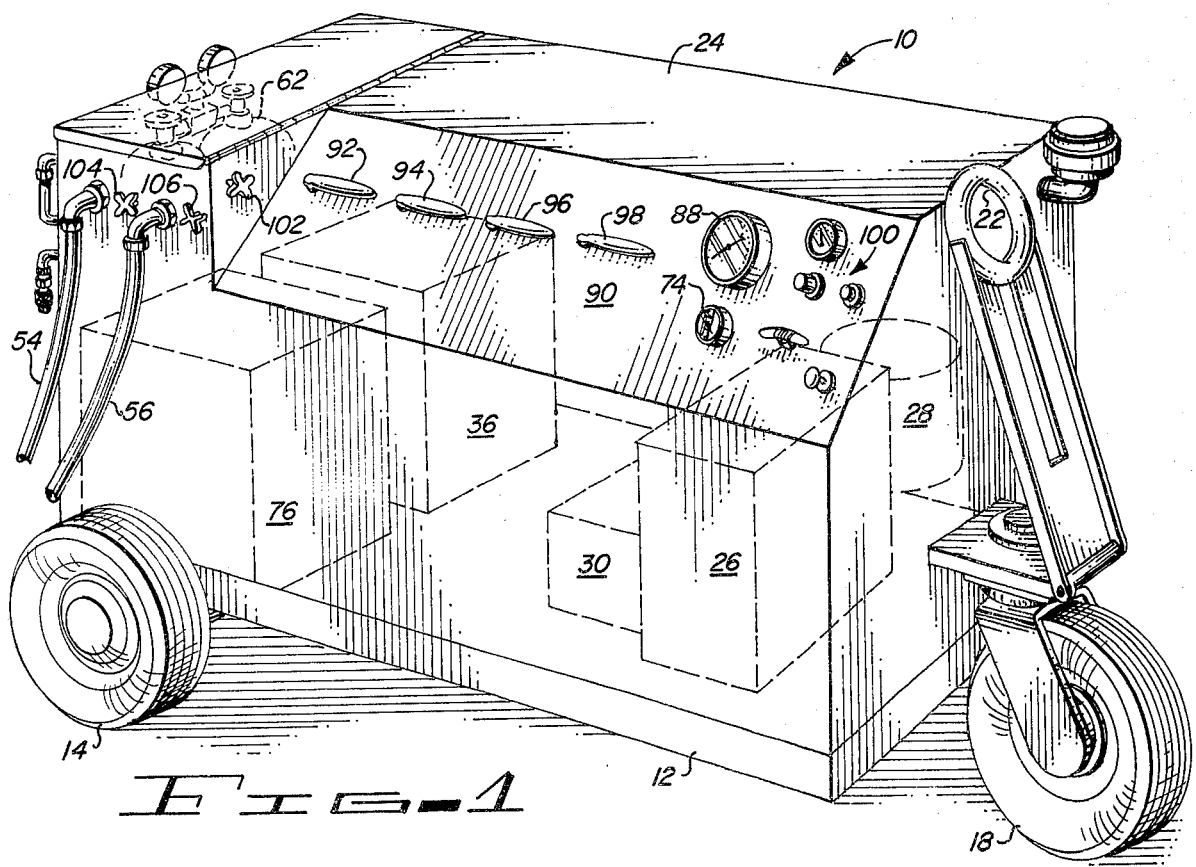
FIG. 1 is a perspective view of the means of the invention supported on a portable vehicle for use in servicing aircraft landing gear struts.
Figure 2:
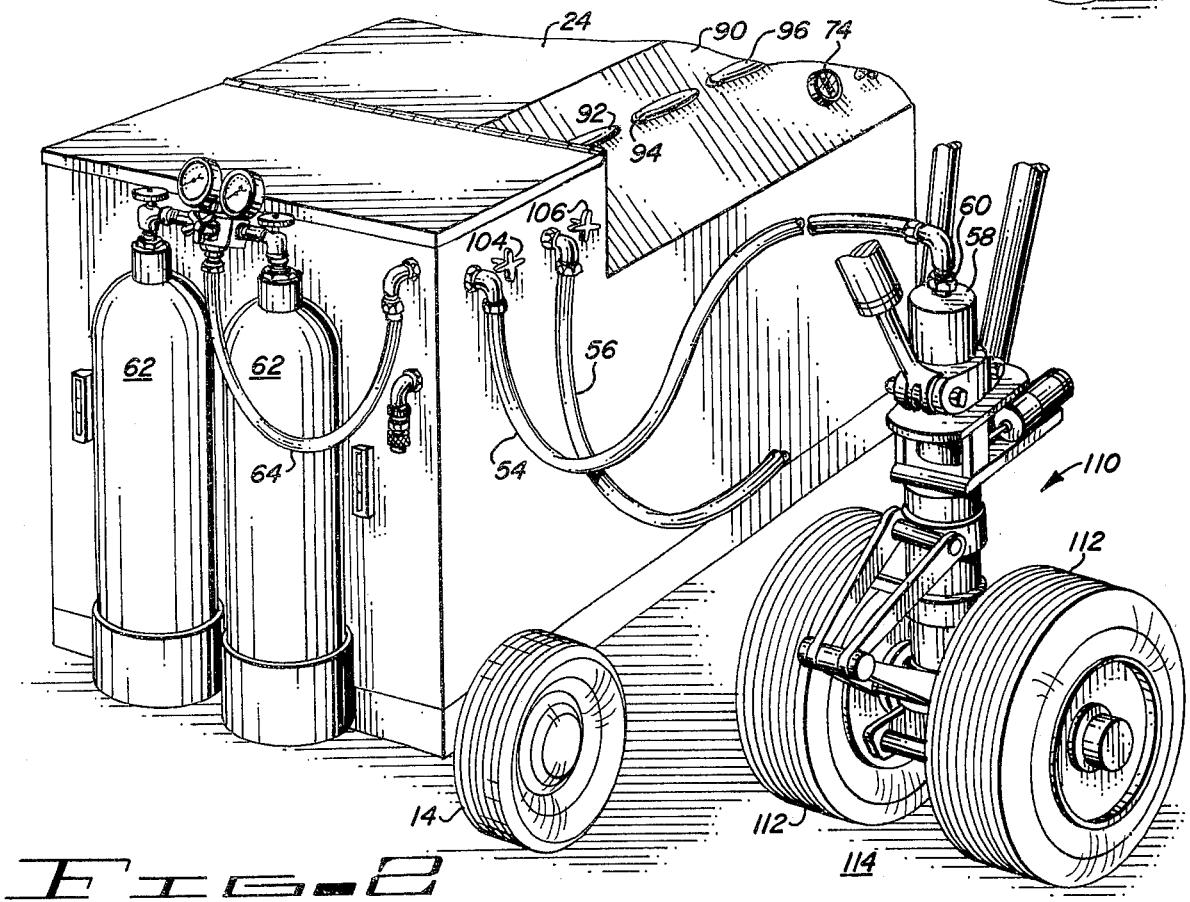
FIG. 2 is a fragmentary perspective view of the means of the invention coupled to a collapsible landing gear strut of an aircraft.

As shown in FIG. 1 of the drawings, the means of the invention comprises a portable cart 10 having a frame 12, carried by wheels 14, 16 and 18. The wheel 18 is a caster wheel pivotal on a substantially vertical axis and coupled thereto is a tongue 20 having a hitch connection 22 of generally ring shaped configuration adapted to be engaged by a conventional pintle hook hitch usually found on service vehicles at airports or aircraft runways. It will be understood that various hitches may be used and that the cart 10 may be self-powered if desired with a vehicle chasis which may be driven by the operator thereof.

The cart 10 is provided with a generally box shaped enclosure 24 housing an engine 26 coupled to a hydraulic pump 28 for driving it. A battery 30 is provided for ignition power for the engine 26. The pump 28 is provided with an inlet 32 coupled by a conduit 34 to a hydraulic fluid supply tank 36. This tank 36 is adapted to supply clean hydraulic fluid to the inlet 32 of the pump via the conduit 34 and the pump is provided with an outlet 34 from which it delivers hydraulic fluid under pressure through a conduit to a check valve 37 and to a valve 38 which communicates with a fluid manifold 40. This manifold 40 communicates with a conduit 42 in which a metering valve 44 is disposed for controlling rate of flow therethrough. The conduit 42 is provided with a plurality of service connections 46 and 48, having flow control valves 45 and 47 as well as metering valves 50 and 52, communicating with flexible conduits 54 and 56 which may be connected to respective aircraft landing gear strut cylinders 58 such as that shown in FIGS. 2, 4, 5 and 6. It will be understood that the connectors 46 and 48 represent only two service connections whereas a great plurality of service connections may be coupled to the conduit 42 for concurrently servicing as many as four or more of the strut cylinders 58 depending upon the requirements of the particular aircraft.

Figure 3:
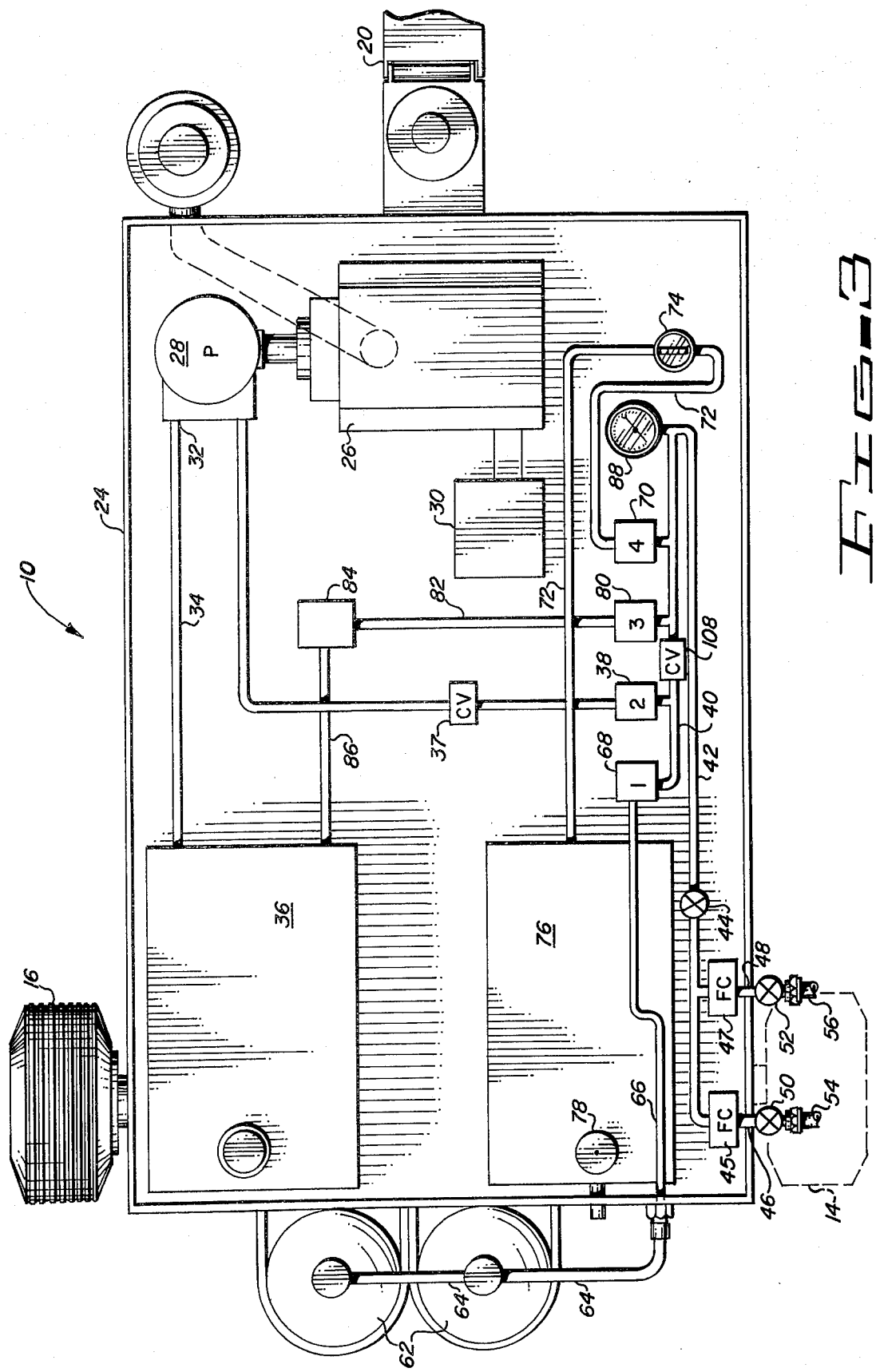
FIG. 3 is a diagramatic plan view of the means of the invention.

Each cylinder 58 represents a part of the pneumatically cushioned collapsible strut mechanism conventional to most aircraft landing gear. At the upper end of each of the cylinders 58 is a fitting commonly known as a "Schrader Fitting". The Schrader Fitting being designated 60 in FIGS. 2, 4, 5 and 6. This fitting 60 is conventionally used for the exhaustion of used fluid from collapsible landing gear strut cylinders 58 and for the introduction of new fluid under pressure as will be hereinafter described in detail. As shown in FIG. 3, the cart 10 carries a pair of nitrogen gas bottles 62 which contain nitrogen highly compressed and these bottles are coupled by conduits 64 to a conduit 66 inside the housing 24 and this conduit 66 communicates with a valve 68 which is a shut-off valve adapted intermittenly to introduce nitrogen gas under pressure into the manifold 40.

Also communicating with the manifold 40 is a used hydraulic fluid exhaust valve 70 which is provided with an outlet conduit 72 having a transparent sight gauge 74 therein for visually inspecting used fluid or purged fluids which passes through the valve 70 and into the conduit 72 as will be hereinafter described in detail.

The conduit 72 communicates with the used fluid container 76 which is adapted to receive used fluid exhausted from the strut cylinders 58 as will be hereinafter described in detail.

The container 76 is adapted to receive used hydraulic fluid as well as used pneumatic fluid and consequently is provided with a vent cap 78 which is adapted to allow the exhaustion of the expending pneumatic fluid such as nitrogen which is exhausted from the cylinder 58 through the respective Schrader valve 60 as will be hereinafter described.

Also communicating with the manifold 40 is a valve 80 adapted for use in returning clean, purged fluid from the manifold 40 through a conduit 82, into a filter 84 which is provided with an outlet conduit 86 communicating with the interior of the tank 36. Thus the valve 80 allows fluid to be returned to the tank 36 when purged fluid passing back from the respective landing gear cylinder 58 appears clear through the site gauge 74 as will be hereinafter described in detail.

Communicating with the manifold 40 and 42 is a pressure gauge 88 which allows the operator to determine when the hydraulic fluid as well as the pneumatic nitrogen fluid are being introduced at the proper pressure. Referring to FIG. 1 of the drawings, it will be seen that the pressure gauge 88 is supported on a control panel 90 of the housing 24 and that a valve handle 92 operates the valve 68, a valve handle 94 operates the valve 38, a valve handle 96 operates the valve 80 and a valve handle 98 operates the valve 70 so that the operation of the various valves 68, 38, 80 and 70 as shown in FIG. 3, may be operated by the respective handles 92, 94, 96 and 98 on the panel 90 as shown in FIGS. 1 and 3 of the drawings.

Also disposed on the panel 90 is the sight gauge 74 and a group of controls 100 are provided for operation of the engine 26. Near the end of the panel 90 a control handle 102 is provided for operating the metering valve 44 to adjust the metering of fluids in the conduit 42 and to the conduit branches 46 and 48 as hereinbefore described.

Manual control knobs 104 and 106 project outwardly from the housing 24 adjacent to the flexible hoses 54 and 56 for controlling the metering valves 50 and 52 hereinbefore described, which are used to coordinate the rates of fluid feeds through the hoses 54 and 56 to insure equal charging rates of the various landing gear strut cylinders 58 in order to insure lowering or elevating the aircraft uniformly as will be hereinafter described in detail.

A check valve as shown in FIG. 3 is designated 108 and is disposed in the conduit 40 to allow flow in a direction toward the metering valve 44, but to prevent flow in a direction toward the valves 38 and 68 to prevent contamination of such valves, as well as the pump 28 and nitrogen supply, when used hydraulic fluid is exhausted from a strut cylinder 58 and when the fluid is either passing through the valve 70 or the valve 80, as will be hereinafter described. Each landing gear strut assembly is generally designated 110 in FIGS. 2, 4, 5 and 6. Each strut assembly is provided with wheels 112 having peripheries which are adapted to rest on a floor surface 114 and floor surface as defined herein may be any wheel supporting surface such as a hangar floor, a runway, or any other suitable support for carrying the load imposed upon the wheel by the respective aircraft.

The procedure with the means and method of the invention for servicing an aircraft landing gear strut is substantially as follows: the cart 10 is towed or moved into close proximity with an aircraft on which the collapsible fluid cushioned struts of the landing gear need service. The hoses 54 and 56 may be connected to a pair of the valve fittings 60 in connection with a pair of respective strut cylinders 658 and as hereinbefore described there are a plurality of hoses 54 and 56 and any number of such hoses may be provided so as to accomodate any number of landing gear struts which may be serviced concurrently by the means and method of the invention.

Figure 4:
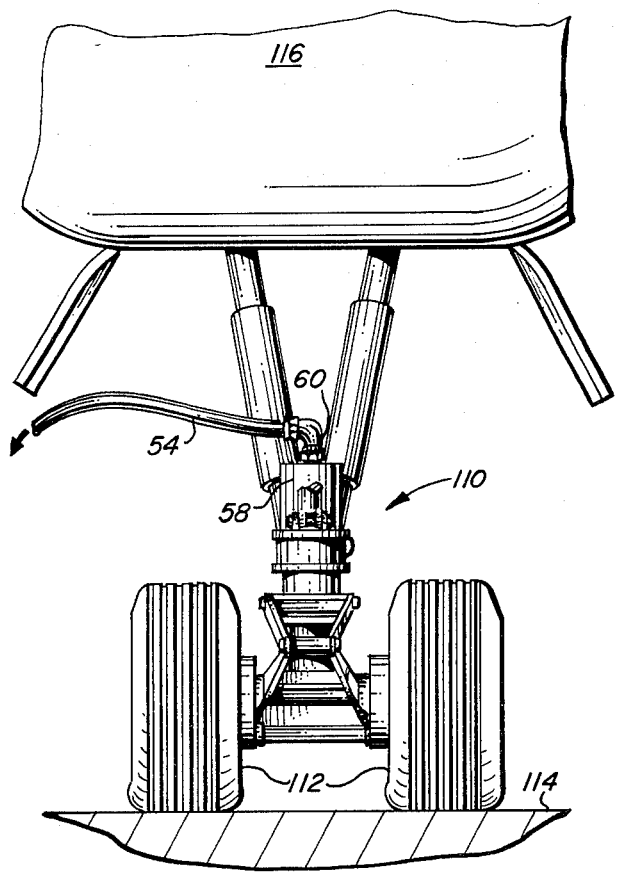
FIG. 4 is a fragmentary elevational view of an aircraft showing a landing gear strut thereof in collapsed position with the aircraft bearing on the strut and moved downward.

When the hose 54, as for example, is coupled to the fitting 60 and the respective Schrader valve is open, the weight of the aircraft fuselage 116 is imposed upon the landing gear strut and wheels 112, and with the valve of the respective fittings 60 in open position, the weight of the aircraft fuselage 116 is allowed to bear upon the strut and this causes compressive force on the fluid therein to exhaust the fluid through the hose 54 and conduit 42, and at this time the metering valve 44 is opened and also the valve 70 is open to allow the used fluid to pass through the conduit 72, the sight gauge 74 and to allow the used fluid to escape into the container 76. It will be understood that compressed gas such as nitrogen gas as well as the hydraulic lubricating fluid both pass through the conduit 72 and into the used fluid container 76. The passage of this fluid is allowed to continue until the aircraft landing gear strut is completely in collapsed position and until the fuselage 116 is in a lower most position as shown in FIG. 4, by solid lines and in FIG. 6 by broken lines 118.

At this time, the engine 26 is started with the valves 38 and 80 in open position with all the other valves closed. This allows the engine 26 to start under no load since hydraulic fluid delivered from the outlet of the pump 28 passes through the conduit 36, through the open valve 38 and backwardly through the open valve 80 and filter 84, returning the oil to the tank 36 from which the oil is at the same time conducted through the conduit 34 to the inlet of the pump 28. Accordingly, the engine 26 is thus started and the hydraulic pump runs free due to the fact that the oil taken from the tank 36 is returned via the valves 38 and 80.

At this time the valve 80 may be closed causing hydraulic fluid under pressure passing through the valve 38 to continue through the conduit 42 and metering valve 44 to the branches 46 and 48 communicating with the metering valves 50 and 52 and the respective hoses 54 and 56 or any number of such hoses as may be utilized depending on the number of struts the means of the invention is designed to service. The hydraulic fluid is then allowed to continue passing through the hose 54, for example, and into the respective strut cylinder 58 until the collapsed cylinder is extended fully to the position shown in FIGS. 5 and 6 thereby elevating the weight of the fuselage 116 to an upper-most position and thus the cylinder 58 is charged with flushing fluid which may then be exhausted from the cylinder 58 by stopping the engine 26 with the valves 38 and 80 in closed position and opening the valve 70, thus allowing the weight of the aircraft to pressurize the purging fluid in the respective cylinder 58 of the landing gear and to force the fluid through the conduit 42, the valve 70 and through the conduit 72 and sight gauge 74 such that the flushing fluid is conducted to the used fluid tank.

When the flushing fluid appears clear through the sight gauge 74 the valve 70 may be closed and the remaining clean flushing fluid may be recycled to the tank 36 by opening the valve 80 and allowing the clean remaining flushing fluid to pass through the conduit 82, filter 84 and the conduit 86 into the tank 36 for reuse.

When the weight of the aircraft compresses or collapses the strut down to an almost fully collapsed position, the valve 80 may be closed leaving sufficient oil in the strut for lubrication which may be indicated by an elevation of the strut as well known to servicing personnel, which may equal one-eighth to one-half inch of upward extension indicating a sufficient amount of lubricating oil present in the strut cylinder 58.

At this time the valves 38, 80 and 70 are closed and in the event that the strut is completely collapsed during the purging operation, it may be necessary to again start the engine 26 with the valves 38 and 80 open as hereinbefore described and then the valve 80 may be closed so that the hydraulic fluid under pressure from the pump 28 passes through the conduit 42 and supplies sufficient hydraulic fluid through the hoses 54 to extend the strut one-eighth to one-half inch as hereinbefore described to supply sufficient hydraulic lubricating oil to the strut preliminary to the addition of compressed nitrogen gas to provide the pneumatic cushion means for the strut.

Figure 5:
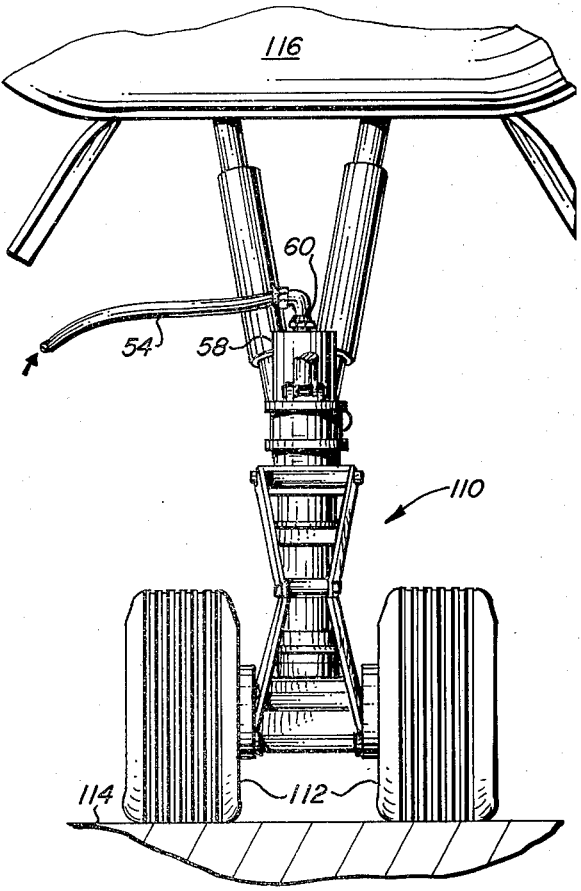
FIG. 5 is a view similar to FIG. 4 showing the aircraft landing gear strut properly charged and moved upward and supporting the weight of the aircraft in an elevated position compared to that as shown in FIG. 4.
Figure 6:
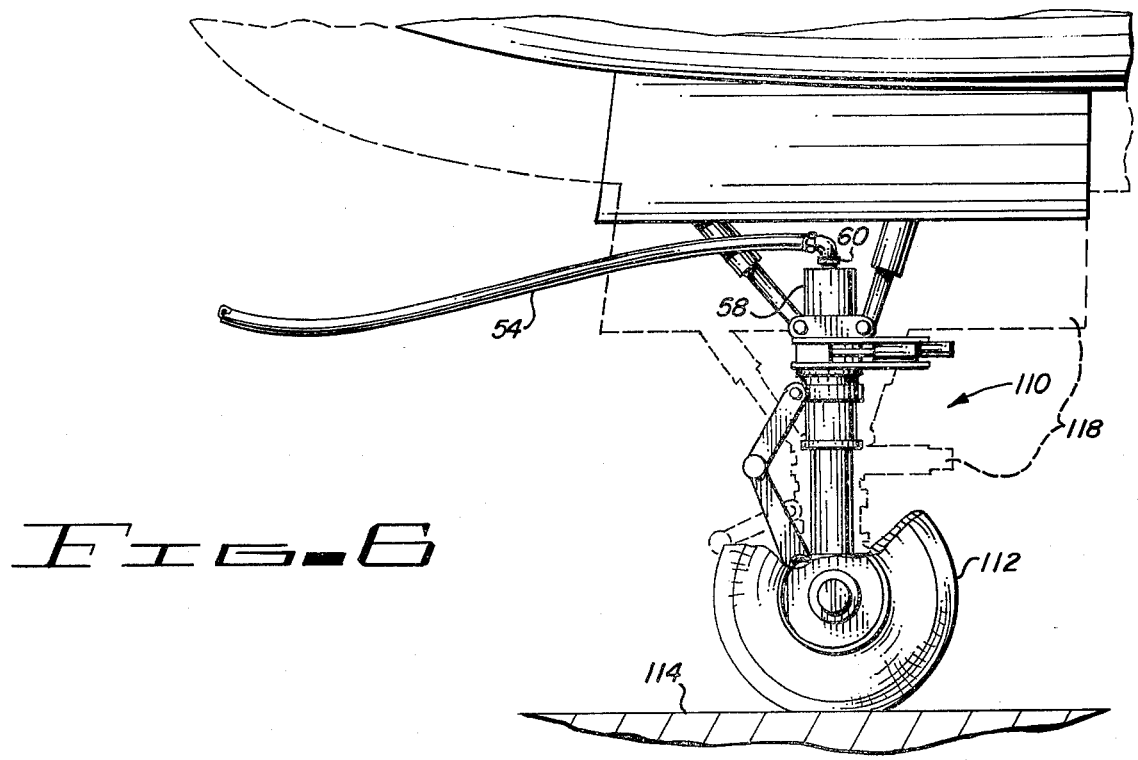
FIG. 6 is a side elevational view of landing gear such as shown in FIGS. 4 and 5, but on a reduced scale and showing the relative disposition of the aircraft and the landing gear in lower and upper positions corresponding to collapsed and properly extended conditions of the landing gear strut.

When the foregoing operations are complete and the strut is properly charged with clean hydraulic fluid to the aforementioned level, the engine 26 is stopped and gas, preferably nitrogen gas under pressure, is conducted from the bottle 62 via the conduit 66 by opening the valve 68 to allow the nitrogen gas under pressure to flow through the conduits 44 and 42, metering valve 44 and the respective hose 54, whereupon the charging of the nitrogen gas into the respective strut cylinder 58 causes the cylinder to extend and causes the strut to raise the weight of the aircraft fuselage 116 to a proper elevated position such as shown in FIG. 5 of the drawings and FIG. 6, affording a sufficient pneumatic charge to provide for efficient pneumatic cushioning of the aircraft landing gear strut.

During all of the foregoing operations the pressure gauge 88 may be observed to indicate the desired pressures of the fluids being released from and charged into the respective strut cylinder 58. The metering valves 44, 50 and 52 control the rate at which the struts 110 may be collapsed or extended so as to maintain stability of the aircraft during the servicing of the various struts either singly or concurrently.

When the strut has been finally charged with the proper amount of pneumatic fluid the Schrader valve 60 is closed and the hose 54 is removed and the aircraft strut is again ready for normal service.

In accordance with the method of the invention the landing gear struts are collapsed by weight of the aricraft with the wheels bearing on a floor surface to expel used fluid from the struts and new fluid is introduced into the struts under pressure thereby elevating the weight of the aircraft with the wheels still bearing on the floor surface, which are hereinbefore defined, means any suitable supporting surface that the wheels may be carried on in a manner to allow the weight of the aircraft to move downward and collapse the strut during purging of used fluid therefrom and during the extension of the strut when being charged, which raises the weight of the aircraft fuselage. Thus it will be apparent to those skilled in the art that the method of the invention greatly simplifies the servicing of struts and thereby obviates the necessity of using jacks for jacking the wheels upward relative to the fuselage and further that the precarious use of jacks is eliminated by the method of the present invention and in addition the wheels of the aircraft supporting the aircraft may thus be engaged with the ground or any of the other floor surfaces whereas the use of jacks may not be properly or safely used on soft runways or uneven surfaces without a degree of hazard.

Figure 7:
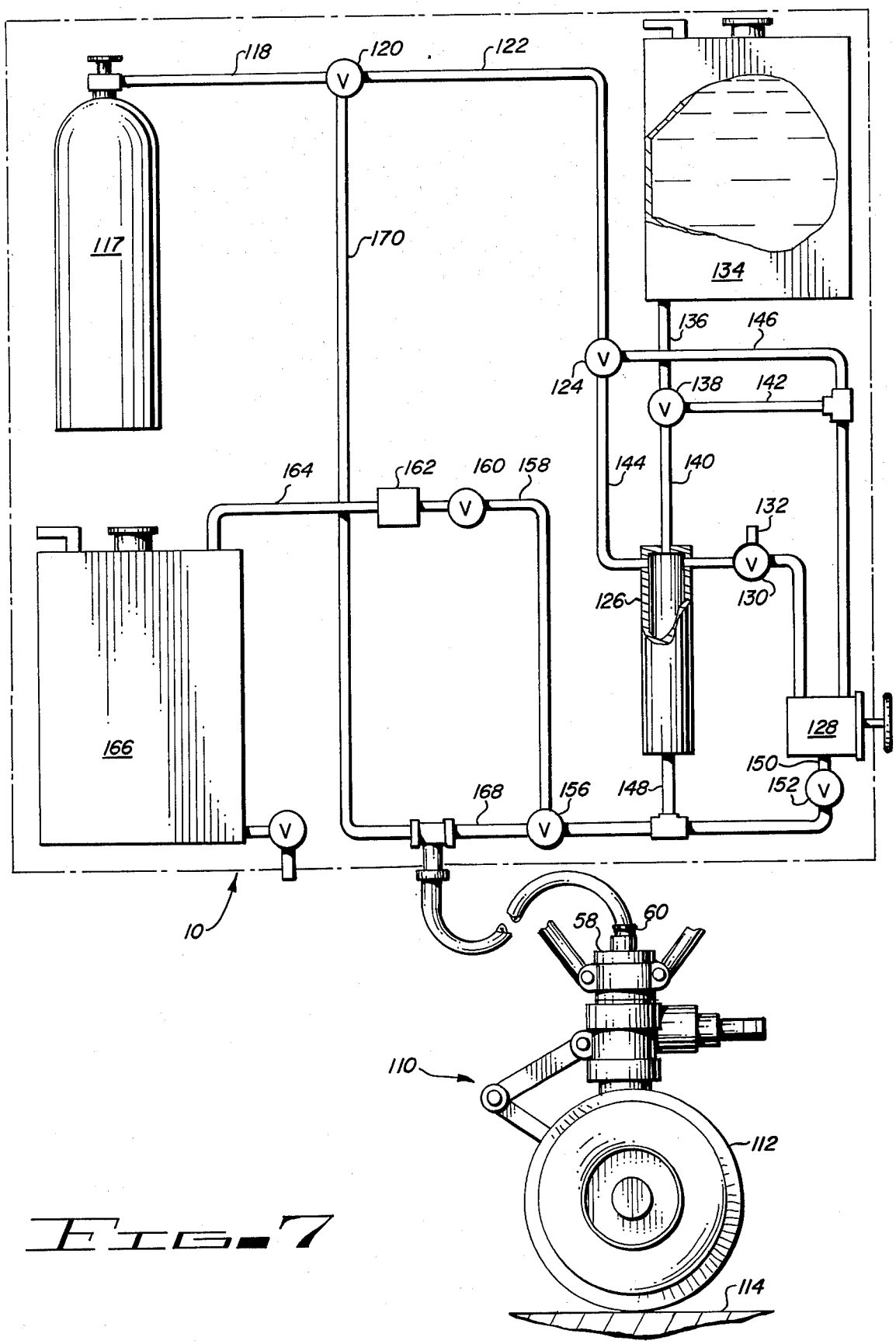
FIG. 7 is a diagramatic view of a modified means of the invention for use in servicing aircraft landing gear struts.

In a modification of the invention as shown in FIG. 7 the method of the invention may be carried out without the use of a hydraulic pump and engine to drive it; all of the pressure requirements are met by means of compressed nitrogen gas in a container 117 which is provided with an outlet conduit 118 communicating through a valve 120 with a conduit 122 delivering fluid through a valve 124 to the interior of a charging cylinder 126 or to another charging cylinder 128 as will be hereinafter described. The cylinders 126 and 128 are provided with a pneumatic vent valve 130 adapted to vent pneumatic fluids therefrom to atmosphere through an outlet 132.

Communicating with the charging cylinders 126 and 128 is a hydraulic fluid tank 134 having an outlet 136 which communicates through a valve 138 with conduits 140 and 142 with the respective charge cylinders 126 and 128.

The valve 124 communicates through conduits 144 and 146 with the charged cylinders 126 and 128.

The charged cylinder 126 is provided with an outlet conduit 148 and the charged cylinder 128 is provided with an outlet conduit 150 communicating through a valve 152 with a conduit 154 similar to the conduit 42 hereinbefore described.

The conduit 154 communicates through a valve 156 similar to the valve 70 hereinbefore described and this valve 156 communicates with a conduit 158 similar to the conduit 72 hereinbefore described. Another valve 160 in the conduit 158 communicates through a sight gauge 162 with a conduit 164 which is adapted to deliver used fluid to a container 166 similar to the container 76 hereinbefore described.

The landing gear strut cylinder 58 is provided with the fitting 60 hereinbefore described and communicating with the valve 156 is a conduit 168 similar to the hose 54 hereinbefore described.

A conduit 170 communicates with the valve 120 and also with the hose 168, all as shown in FIG. 7 of the drawings.

In operation the weight of the aircraft is allowed to collapse the strut as hereinbefore described, exhausting used hydraulic and pneumatic fluid through the valve 156 and the valve 160 and sight gauge 162 and conduit 164 to the container 166. At this time the valve 156 prevents flow of the used fluid into the conduit 154.

When the pneumatic and hydraulic fluids are exhausted from the cylinder 58, the valve 156 may be operated to allow flow through the conduits 154 and the conduit 168 only and at this time the valve 120 is operated to allow flow through the conduits 118 and 122 only and through the valve 124 to the conduit 144 only which forces hydraulic fluid from the charged cylinder 126 into the strut cylinder 58 for fully extending the strut and filling it with flushing fluid.

Accordingly pressure of the gas from the container 117 imposes force on the hydraulic fluid in the cylinder 126 which has been charged from the main hydraulic fluid tank 134, through the valve 138. Thus only a small amount of nitrogen is used for forcing the hydraulic fluid from the cylinder 126 during the charging of the strut cylinder 58 with the flushing fluid.

When the strut is fully extended and in the position as shown in FIG. 5 and full of flushing fluid the valve 156 is again opened to provide flow through the conduit 158, valve 160, sight gauge 162 and conduit 164 to the used fluid container 166. At this time the valve 130 is opened to exhaust pneumatic fluid from the charged cylinder 126 as it is again charged by gravity of fluid passing from the tank 134 to recharge the charged cylinder 126.

The desired amount of hydraulic fluid may then be added to the strut cylinder 58 by means of the charged cylinder 128 which is filled from the tank 134 via the valve 138 and this charged cylinder 128 may be adjusted to carry the desired capacity of hydraulic fluid required for operating the aircraft landing gear strut. At this time the valve 152 may be opened and also the valve 120 and the valve 124 may be opened to impose pneumatic pressure on the hydraulic fluid in the charged cylinder 128 and the valve 152 is opened to allow flow through the valve 156 in open position so that the hydraulic fluid charge may be accomplished within the strut cylinder 58. It will be noted that during the charging of the charged cylinder 128 the valve 138 may be closed to prevent the flow of nitrogen gas under pressure into the conduits 136 and 140.

After the hydraulic fluid has been charged from the charged cylinder 128 the valve 152 may be closed and the valve 130 opened to vent compressed pneumatic fluid such as nitrogen from the hydraulic charged cylinder 128.

At this time the valve 120 may be opened to the conduit 170 only before finally charging the strut cylinder 58 with compressed nitrogen gas to thereby elevate the aircraft weight by extending the strut 170 to its normal elevated operating position.

The method used in connection with the modification as in FIG. 7 is similar to that as hereinbebefore described in connection with the structure disclosed in FIG. 1 of the drawings and the use of the weight of the aircraft for exhausting used fluid from the streeut as well as the charging of the strut and extending it to raise the weight of the aircraft is common to the use of the equipment shown in the modification of FIG. 7. Accordingly it will be appreciated that the modification as shown in FIG. 7 merely used compressed gas to force the hydraulic fluid into the strut cylinder 58 in lieu of using an engine driven pump as disclosed in FIG. 3 of the drawings.

It will be obvious to those skilled in the art that various modifications may be resorted to without departing from the spirit of the invention.

We claim:

1. A method for servicing fluid cushioned collapsible aircraft landing gear struts comprising: allowing an aircraft to rest and bear on its landing gear with the supporting wheels thereof in contact with a floor surface such as hangar floor, runway, or any other support; then opening a fluid fitting in each respective landing gear strut while allowing the weight of the aircraft to move downward uniformly under the force of gravity thereby collapsing said struts and thereby forcing used fluid therefrom; then applying new fluid under pressure through said fitting and thereby uniformly extending said struts and uniformly elevating said aircraft while the weight of said aircraft is still supported on said struts and while the respective wheels are still engaged with said floor surface.

2. The invention as defined in claim 1, wherein: said new fluid is hydraulic flushing fluid; then permitting said flushing fluid to escape from said struts while the weight of said aircraft causes it to move down and again collapses said struts and expels said flushing fluid from said struts.

3. The invention as defined in claim 2, wherein: some of said flushing fluid is retained in said struts for lubrication; and then forcing pneumatic fluid through said fitting until said struts are further extended to a position wherein each of said struts elevates said aircraft and supports its share of weight of said aircraft at the proper elevation; then closing said fitting to retain said lubricating oil and said pneumatic fluid in said struts.

4. The invention as defined in claim 1, wherein: a conduit is coupled to said fitting and to a container for collecting fluid forced from said struts when said aircraft moves down by force of gravity to collapse said struts during the expelling of used fluid therefrom.

5. The invention as defined in claim 2, wherein: a conduit is coupled to said fitting and to a container to collect used fluid therefrom when said fluid is forced from from struts as force of gravity causes said aircraft to move downward and to collapse said struts.

6. A means for servicing fluid cushioned collapsible aircraft landing gear struts comprising a portable frame; fluid supply means adapted to contain fluid and carried on said frame; second means communicating with said fluid supply means; said second means adapted for pressurizing said fluid and adapted for delivering said fluid under pressure into a landing gear strut; said second means adapted to deliver said fluid under sufficient pressure to fill and extend said strut while elevating the weight of said aircraft by means of said strut; a container carried by said frame and communicting with said second means for receiving used fluid from said strut; and valve means communicating with said second means and said container alternately to exhaust fluid from said strut into said container and to deliver fluid into said strut via said second means, said second means is provided with a source of compressed pneumatic fluid and a source of hydraulic fluid; and accumulator means wherein said compressed pneumatic fluid imposes pressure on said hydraulic fluid whereby said accumulator is adapted to deliver hydraulic fluid under pressure to said strut.

7. The invention as defined in claim 6 wherein said second means is also provided with control valve means disposed alternately to deliver said hydraulic fluid from said accumulator into said strut and to deliver pneumatic fluid from said source of compressed pneumatic fluid into said strut.

* * * * *